(12) United States Patent
Willemsen et al.

(10) Patent No.: US 8,031,996 B2
(45) Date of Patent: Oct. 4, 2011

(54) FLEXIBLE CONTINUOUS TAPE FROM MULTIFILAMENT YARN AND METHOD FOR MAKING THESE

(75) Inventors: Stef Willemsen, Rheden (NL); Peter Gerard Akker, Doetinchem (NL); Huibert Cornelis Kwint, Veenendaal (NL); Adrianus Johannus Wilhelmus Van Haren, Arnhem (NL)

(73) Assignee: Teijin Aramid B.V., Arnhem (NL)

( * ) Notice: Subject to any disclaimer, the term of this patent is extended or adjusted under 35 U.S.C. 154(b) by 0 days.

(21) Appl. No.: 12/734,898

(22) PCT Filed: Nov. 26, 2008

(86) PCT No.: PCT/EP2008/066179
§ 371 (c)(1),
(2), (4) Date: Jun. 1, 2010

(87) PCT Pub. No.: WO2009/068541
PCT Pub. Date: Jun. 4, 2009

(65) Prior Publication Data
US 2010/0266247 A1 Oct. 21, 2010

(30) Foreign Application Priority Data
Nov. 30, 2007 (EP) .................... 07023191

(51) Int. Cl.
*G02B 6/44* (2006.01)
(52) U.S. Cl. ......... 385/100; 385/102; 385/104; 385/113
(58) Field of Classification Search ................ 385/100, 385/102, 103, 104, 113, 114
See application file for complete search history.

(56) References Cited

U.S. PATENT DOCUMENTS

| 3,873,389 A | 3/1975 | Daniels |
| 4,626,306 A | 12/1986 | Chabrier et al. |
| 4,720,366 A | 1/1988 | Binnersley et al. |
| 5,082,347 A * | 1/1992 | Akasaka et al. ............ 385/114 |
| 5,503,928 A | 4/1996 | Cheshire |
| 5,567,794 A * | 10/1996 | Barraud et al. ............. 528/70 |
| 6,270,851 B1 | 8/2001 | Lee et al. |
| 7,116,872 B2 * | 10/2006 | Okuno et al. ............... 385/114 |
| 7,438,975 B2 * | 10/2008 | Willemsen et al. ........... 428/375 |
| 7,758,960 B2 * | 7/2010 | Boerstoel et al. ........... 428/364 |
| 7,813,606 B2 * | 10/2010 | Yasutomi et al. ........... 385/113 |
| 2002/0028287 A1 * | 3/2002 | Kawada et al. ............ 427/163.1 |
| 2006/0137156 A1 | 6/2006 | Kawabe et al. |
| 2008/0251965 A1 * | 10/2008 | Willemsen et al. ......... 264/210.3 |
| 2009/0279834 A1 * | 11/2009 | Matthijsse .................... 385/114 |
| 2010/0074585 A1 * | 3/2010 | Shimizu et al. .............. 385/129 |
| 2010/0266247 A1 * | 10/2010 | Willemsen et al. .......... 385/100 |
| 2010/0322573 A1 * | 12/2010 | Yasutomi et al. ............ 385/102 |

FOREIGN PATENT DOCUMENTS

| EP | 0 316 922 A2 | 5/1989 |
| EP | 0 569 928 A1 | 11/1993 |
| EP | 0 837 162 A1 | 4/1998 |
| FR | 2 516 441 A1 | 5/1983 |
| GB | 1 433 128 | 4/1976 |
| JP | A-10-130996 | 5/1998 |
| WO | WO 03/091006 A2 | 11/2003 |
| WO | WO 2004/090628 A2 | 10/2004 |

OTHER PUBLICATIONS

Written Opinion of the International Searching Authority issued in International Application No. PCT/EP2008/066179 on Jun. 24, 2009.
International Search Report issued in International Application No. PCT/EP2008/066179 on Jun. 24, 2009.

* cited by examiner

*Primary Examiner* — N. Edwards
(74) *Attorney, Agent, or Firm* — Oliff & Berridge, PLC

(57) ABSTRACT

A method for making a flexible fibrous continuous tape containing 60 to 98 wt % fiber based on the weight of the tape, from multifilament yarn selected from aramid, glass, aromatic polyester, and rigid rod polymer, comprising the steps: a1) spreading the filaments of the yarn to obtain a filament layer having a cross sectional aspect ratio (w/h) of 2 to 2000; and b1) treating the spread filaments with a curable resin, or a liquid thermoplastic resin or wax; or a2) treating the yarn with the curable resin, or the liquid thermoplastic resin or wax; and b2) spreading the filaments of the yarn to obtain a filament layer having a cross sectional aspect ratio (w/h) of 2 to 2000; followed by c) fixating the filaments by curing or solidifying the resin to obtain the tape, wherein steps a1-b1, respectively a2-b2, and c are performed in-line.

8 Claims, No Drawings

US 8,031,996 B2

FLEXIBLE CONTINUOUS TAPE FROM MULTIFILAMENT YARN AND METHOD FOR MAKING THESE

BACKGROUND

The invention pertains to a method for making a flexible fibrous continuous tape from multifilament yarn, and to tapes thus made. The invention further relates to optical fiber cables comprising said tape.

Tapes reinforced with fibers (also called yarns) are known. For instance, in JP 10-130996 a carrier tape has been described: This carrier tape is produced by using a flat fiber structure having a width nearly equal to the width of the tape as a reinforcing material and a resin as a matrix. The fiber structure is a three-dimensional braid of a yarn.

In GB 1433128 a warp-knitted tape, for reinforcing matrix materials, has been described. The tape may comprise two high modulus carbon filament tows.

In WO 03/091006 a method is described of producing a novel material comprising natural fiber bundles that are pre-impregnated with organic resin and taking the form of a yarn or ribbon.

In U.S. Pat. No. 4,626,306 a method for making flexible fibrous strips has been described containing unidirectional fibers embedded in a thermoplastic resin. According to this method a lap of parallel fibers is impregnated with resin particles, by separating out fibers from a roving of fibers. A roving (or sliver) is a long and narrow bundle of fiber with a twist to hold the fiber together. The fibers are spread from the roving, but in this method only the fibers, not the individual filaments of the fiber, are spread. This method thus only provides a method that leads to surface treatment of each fiber with resin, whereas the individual filaments in the core of the fiber are not impregnated.

Similarly, in EP 316922 a method has been described wherein the fibers of a roving of fibers are unbound from the roving and are spread, followed by impregnation of the spread fibers with a resin emulsion. The individual filaments of each fiber are not spread, and again only the surface filaments of the fiber are impregnated with the resinous material.

U.S. Pat. No. 3,873,389 relates to graphite sheets which are not impregnated in-line, but first positioned in side-by-side coplanar relation, and then impregnated. The present invention does not relate to graphite and not to sheets that are not made in-line.

In the manufacture of reinforced composites having reinforcing filaments within a matrix, a filament consisting of a staple yarn spun from discontinuous fibers with low twist was disclosed in U.S. Pat. No. 5,503,928. An apparatus for continuously coating the fiber filaments wherein each filament of a fiber bundle is coated continuously in a narrow flow path of a zigzag shaped tunnel has been described in U.S. Pat. No. 6,270,851.

These known tapes thus contain fibers for reinforcing the resin matrix. Such tapes have the disadvantage that there is a relatively weak interaction between fiber and matrix. The fibers are embedded in the matrix, but only the inner filaments have an acceptable contact with the matrix. If all filaments are continuously coated, such as in U.S. Pat. No. 6,270,851, the tape contains considerable amount resin, usually 60 wt % or more, and relatively minor quantities of fiber. The resin gives a significant weight contribution to the composite (typically less than 40 wt % fiber) and the favorable properties of high-performance fibers such as aramid become less dominant as compared on a weight basis with the present invention (for example in terms of modulus, elongation at break, breaking strength). The high amounts of resin also cause an extra cost contribution in case high-performance fibers are used as well. Furthermore, the high amounts of resin decrease tape flexibility thereby causing difficulties in e.g. optical fiber cable production, since decreased bending properties may cause problems during e.g. connector positioning.

Therefore, there is an increasing need for fibers in the form of flexible continuous tapes which cannot be obtained by the known methods. In EP 837162 and US 2006/0137156 an attempt for improvement was made by spreading the filament of a multifilament yarn. Thus the filaments were spread by air blowing to better allow the resin to penetrate between the filaments. This reference however does not relate to tapes but to fiber reinforced plastics.

Similarly, in EP 569928 a method for spreading filaments and impregnation with a thermoplastic resin was described. Again this process is not intended to make tapes but to reinforce thermoplastic matrix.

SUMMARY

The present invention has not to its object reinforcing a resin matrix, but to obtain flexible continuous tapes made from fibrous material containing as less as possible matrix material. This object was reached by a novel method for making a flexible fibrous tape containing 60 to 98 wt % fiber based on the weight of the tape, from multifilament yarn selected from aramid, glass, aromatic polyester, and rigid rod polymer, comprising the steps:

a1) spreading the filaments of the yarn to obtain a filament layer having a cross sectional aspect ratio (w/h) of 2 to 2000; and b1) treating the spread filaments with a curable resin, or a liquid thermoplastic resin or wax; or a2) treating the yarn with the curable resin, or the liquid thermoplastic resin or wax; and b2) spreading the filaments of the yarn to obtain a filament layer having a cross sectional aspect ratio (w/h) of 2 to 2000; followed by c) fixating the filaments by curing or solidifying the resin to obtain the tape, wherein steps a1-b1, respectively a2-b2, and c are performed in-line.

DETAILED DESCRIPTION OF EMBODIMENTS

Contrary to the prior art materials, which were not specifically tapes and primarily are resin materials that are reinforced, the present products are fibrous materials wherein the resin has to its object to fixate the individual filaments of the fiber. Thus the fibers do not reinforce the matrix, which is only present in low quantities, most preferably even less than 30 wt %, but the fiber is the material of which the tape is primarily made and the low quantities of resin are only used to immobilize the filaments.

It is therefore another object of the invention to provide a flexible continuous tape made of layer comprising filaments and having a cross sectional aspect ratio (width/height) of 2 to 2000. Those tapes can be extremely strong and thin and nevertheless remain flexible. They usually contain a total number of 6-4000 filaments. It was further found that the tapes thus obtained do hardly or not show loss of tenacity in comparison with the untreated yarn.

The tapes of the invention comprise filaments fixated by a cured or solidified resin, wherein the width/height ratio of the tape is 2 to 2000, preferably 10-1000, most preferably 20-500. These tapes can be used in applications which require high tenacity, such as for use as orthopedic tape, tube, hose, or pipe reinforcing tape, for reinforcing sails, and tape for use in electric or optical fiber cables. The tapes can optionally be wound on a spool.

The invention also allows making very small micro-tapes which tapes have a width of less than 0.5 mm and a cross sectional aspect ratio (width/height) of 2 to 20. These micro-tapes may find use in medical applications.

Tapes of the invention wherein the cross sectional aspect ratio (w/h) is 20 to 500 are particularly suitable for application in optical fiber cables. High performance fibers with a superior modulus, strength, and a high heat resistance are currently used as reinforcing material in optical fiber cables. High strength and modulus of the high performance fibers prevent the optical glass fibers in the cable to be subjected to external forces resulting in breakage of the glass fibers. Usually the optical glass fibers are located in thin thermoplastic hollow tubes in the cable (so-called central and loose tube constructions) or a thermoplastic layer is extruded on the optical fiber (tight-buffered construction). Generally the inner cable is completely covered by the reinforcing fibers, especially for the tight-buffered construction. Another important characteristic of high performance fibers is their excellent heat resistance. During the production of the optical fiber cable, a thermoplastic jacket is extruded around the inner cable to protect against weathering. The high performance fibers located in between the jacket and the tubes form an insulation layer and prevent melt fusion of both parts during extrusion. As a result of melt fusion the transmission of the optical signals can be disturbed. Melt fusion will also make the connectorization of the cable impossible in case of a tight-buffered cable. To prevent melt fusion in cases where it is not wanted, more reinforcing material as insulator in this cable is used than is desired from the viewpoint of cable strength or cable modulus.

It is also an objective of this invention to produce a tape which is flexible enough to cover the inner cable efficiently, which enables using significantly less reinforcing fiber. Furthermore, by using the tape of this invention a reduction of optical fiber cable diameter and weight is possible. This has the advantage that more optical fiber cables can be used in an existing conduit for cables and more connections between working stations and users are possible. It is also possible to finish the tape of the invention with superabsorbent materials, for instance by treating the tape with a superabsorbent-containing water-in-oil emulsion. Similarly other functionalities can be added, in case they are needed.

In some cables between 2 and 12 optical fibers are stacked and impregnated to form ribbons. The tapes from the present inventions can be very conveniently combined with such ribbons and thus simplify the production of such cables. The application of such tapes will also offer possibilities to simplify the labor-intensive cable preparation for attachment to a connector or splice-box.

It is important that the fibers after having undergone spreading of the filaments are fixated as soon as possible to prevent entangling of the filaments and fluffing, and to maintain its required dimensional properties (such as width and height). This object is obtained by using other curable, liquid thermoplastic resins or liquid wax, and after being cured or solidified will fixate (immobilize) the filaments permanently. It is therefore important that the curing or solidifying process is performed as quickly as possible. This is attained by performing the process in-line, i.e. all process steps are performed without intermediate isolation of intermediate products. Most of the resins of the prior art are unsuitable for such quick fixation. Curable resins are particularly preferred since these can quickly be hardened, thereby trapping the filaments to fixation. In principle both heat- and radiation-curing (such as UV and electron beam curing) can be used. Heat curing can preferably be performed with thermoset resins (suitable examples include among others epoxy, vinyl ester, unsaturated polyester, polyurethane, and phenolic resins). In a convenient method the spread filaments are led through a bath, a die, or an applicator, containing curable resin, and then led to heated rollers, a hot-air oven, a hot-plate, or a combination thereof, on which the resin quickly cures, thereby fixating the filaments. In another embodiment when using liquid thermoplastic resin, the spread filaments are led through a bath, a die, or an applicator, and then led to cooled rollers to obtain quick solidification of the resin. If so required the yarn may be dried, for example after having performed process step b1) or a2).

Even more conveniently radiation-curable resin is applied onto the spread filaments. Suitable radiation-curable resins are for example resins containing allyl, vinyl, or (meth)acrylate functionality. These resin treated filaments are immediately led into an irradiation area, such as an area with a UV lamp or in an electron beam area, under which conditions the resin instantaneously cures. The fast curing allows high processing speeds, which makes UV-curing commercially attractive. For instance, in-line application and UV-curing can be considered as a post-treatment step in a high-speed spin-line up to 700 m/min.

In another conveniently method the yarn bundle is treated with a liquid thermoplastic resin or wax. A liquid thermoplastic resin or wax is a thermoplastic resins or wax that is liquid by being beyond its melting point, or by dissolution or emulsification in a solvent. These materials solidify by lowering the temperature to below their melting point, or by removing the solvent, for instance by evaporation. Suitable solvents are water or common organic solvents such as toluene, isohexadecane, ethanol, acetone, ether and the like. More conveniently is a method in which the yarn bundle is treated with a low viscous aqueous solution or dispersion of the thermoplastic resin or wax. The low viscous aqueous dispersion quickly penetrates in the yarn bundle and spreads out the resin or wax over the filaments. Next, the water phase is completely or partly removed by contact-less heating in, for example, a hot air oven and the yarn bundle is spread using one or more rods. Immediately after the rods, the spread yarn is further heated to evaporate the rest amount of water and/or to fixate the thermoplastic resin on the surface of a hot roller, such as for example a hot godet. A second godet can be used to allow an easy winding of the flexible tape. In case a dispersion of molten wax or thermoplastic resin is used, it is preferred that after the rod spreading step, the yarn is lead over a cold roller to fixate the filaments in the tape. The width of the tape can be set by the use of one or more spreading rods. Also the yarn tension before the hot roller or godet affect the final width of the tape, which makes it possible to tune the width of the tape without using spreading rods by only controlling the yarn tension.

To obtain flexible tapes it is important to apply as low as possible amounts of resin. The tapes do contain at least 60 wt % fiber, more preferably at least 70 wt % (based on the weight of the tape), and when a UV-curable resin or wax is used, preferably at least 80 wt % is fiber. When using thermoplastic resins even higher quantities of fiber are satisfactory, and preferably at least 90 wt % fiber is used.

The flexible nature of the tapes of the invention allows easy bending of the tape. The tape of the invention therefore is suitable to bend to obtain a cylindrically shaped object, and the longitudinal sides of the tape can then be adhered to each other by an adhesive. In this manner tubes can be made from the tape of the invention.

As adhesive a common adhesive can be applied, but usually it is preferred to use the same resin as used for fixating the filaments. When a thermoplastic resin is used it is not necessary to apply this resin as an adhesive. Usually it is sufficient to bend the tape, which both longitudinal ends to each other, and heating and cooling these ends whereby the resins liquefies and solidifies to seal the longitudinal end to each other.

The method of the invention is suitable for any fiber, and is used for making tape of aramid, glass, aromatic polyester, or rigid rod polymer yarn. Preferably, the method is used for making aramid tape.

The invention is further illustrated by the following non-limitative examples.

EXAMPLES

Example 1

The following UV-curable resins were obtained from Rahn AG (Switzerland) and mixed in the following ratio (Table 1): Genomer™ 4302 (59 wt %), Miramer™ M3130 (36 wt %) and Genocure™ LTM (5 wt %). Genomer 4302 is a UV-curable acrylate resin that contains >90 wt % aliphatic polyester triurethane tri-acrylate. Miramer M3130 is a trifunctional reactive acrylate monomer, containing ethoxylated trimethylolpropanetri-acrylate. Genocure LTM is a liquid photo-initiator blend. In the following examples the used mixture is referred to as "the UV-curing acrylate mixture".

TABLE 1

Composition of UV-curing acrylate mixture

| Trade name | Functional identification | Parts by weight |
|---|---|---|
| Genomer 4302 | Acrylate resin | 59 |
| Miramer M3130 | Reactive acrylate monomer | 36 |
| Genocure LTM | Photoinitiator | 5 |

UV-Curing Set-Up

A F300 Fusion UV lamp was installed and used in order to facilitate yarn curing at speeds of 40 m/min. The F300 Fusion UV lamp was equipped with a high-pressure mercury light bulb ("H" bulb) with a total power output of 1800 W. In addition, a C6-1 wire & cable reflector from Fusion UV was installed in order to guarantee circular illumination. The yarn was spread using five fixed circular rods with a diameter of 6 mm in combination with two Rapal100 3.94336 preparation thread guides (applicators) from Rauschert. Winding was done on 94 mm tubes with a Barmag winder using a take-up winder guide Rapal100 3.94013 R from Rauschert. In the following examples this set-up is referred to as "the UV-curing set-up".

Six experiments were done using two types of Twaron yarn with each two different dtex values (Table 2): Twaron®1000 1680f1000 and Twaron® D2200 1610f1000 (ex Teijin Aramid, Netherlands) were both unwounded from a standard commercial bobbin at the UV-curing set-up and two times impregnated with 10-15 wt % UV-curing acrylate mixture. This resulted in a tape width after curing and winding of about 2 mm, and to approximately six filament layers.

Twaron® 1000 1680f1000 and Twaron® D2200 1610f1000 were both unwounded from a standard commercial bobbin at the UV-curing set-up and two times impregnated with 15-20 wt % (based on the yarn weight) UV-curing acrylate mixture. This resulted in a tape width after curing and winding of about 4 mm, and to approximately three filament layers.

Twaron® 1000 3360f2000 and Twaron® D2200 3220f2000 were both unwounded from a standard commercial bobbin at the UV-curing set-up and two times impregnated with 10-15 wt % (based on the yarn weight) UV-curing acrylate mixture. This resulted in a tape width after curing and winding of about 4 mm, and to approximately six filament layers.

TABLE 2

Overview of six UV-curing experiments using Twaron 1000 and D2200 yarn.

| | Linear density (nominal) [dtex/filaments] | Tape width after UV-curing acrylate mixture | |
|---|---|---|---|
| | | 30-40 wt % mixture# tape width (mm)*/height (mm)*/w/h ratio | 20-30 wt % mixture# |
| Twaron 1000 | 1680f1000 (tube size: 290 × 94 mm) | 4/0.036/111 | 2/0.072/28 |
| Twaron 1000 | 3360f2000 (tube size: 216 × 94 mm) | — | 4/0.072/56 |
| Twaron D2200 | 1610f1000 (tube size: 216 × 94 mm) | 4/0.036/111 | 2/0.072/28 |
| Twaron D2200 | 3220f2000 (tube size: 216 × 94 mm) | — | 4/0.072/56 |

*mean values
based on yarn weight
— not tested

Example 2a to 2c

A package of Twaron D2200, 1610 dtex/f 1000 yarn was subjected to the following treatments. The aramid yarn package was rollingly unwound while successively passing the yarn over a liquid applicator, through two hot air ovens (length 3 m each), passing the yarn over a number of spreading rods, passing the yarn over godet A and next godet B and was finally wound into a package. With the liquid applicator and a tubing pump, the yarn was impregnated with different amounts of a liquid thermoplastic resin (see table 3). In the oven, the solvent was partly or completely evaporated. The spreading rods used had a diameter of 7 mm. The temperature of godet A could be adjusted, while the temperature of godet B was equal to the room temperature (~20° C.). In table 4, the process conditions and the characteristics of the produced tapes are mentioned.

TABLE 3

Liquid thermoplastics and waxes used

| Entry | Product name | Supplier | Composition |
|---|---|---|---|
| 1 | Alberdingk Boley U400N | Alberdingk Boley, Krefeld, Germany | polyether-polyurethane dispersion |
| 2 | Impranil DLF | Bayer AG, Leverkusen, Germany | polyester-polyurethane dispersion |
| 3 | Alberdingk Boley U615 | Alberdingk Boley, Krefeld, Germany | polycarbonate-polyurethane dispersion |
| 4 | Acquacer 498 | BYK-Cera, Deventer, The Netherlands | paraffin wax dispersion |
| 5 | Acquacer 1547 | BYK-Cera, Deventer, The Netherlands | high density polyethylene wax dispersion |

TABLE 4

| | Experiment no. | | |
|---|---|---|---|
| | 2a | 2b | 2c |
| Yarn speed m/min | 24 | 75 | 25 |
| Liquid thermoplastic used | Entry 1 as a 10 wt % aqueous dispersion | Entry 1 as a 10 wt % aqueous dispersion | Entry 2 as a 10 wt % aqueous dispersion |
| Active polymer content dosed onto the yarn in wt % | 8.5 | 6.0 | 4.5 |
| Temperature $1^{st}/2^{nd}$ oven | 120° C./120° C. | 110° C./110° C. | 240° C./270° C. |
| Total residence time in ovens | 15 seconds | 14.4 seconds# | 14.4 seconds |
| Number of fixed spreading rods | 5 | 5 | 5 |
| Godet A, temperature | 145° C. | 120° C. | room temperature |
| Wraps on godet A | 5 | 4 | 4 |
| Yarn tension after godet A | 1950 cN | 3000 cN | 1500 cN |
| Wraps on godet B | 6 | 7 | 7 |
| Produced flexible continuous tape: | | | |
| width in mm | 3.5 | 3.0 | 3.7 |
| height in mm | 0.05 | 0.07 | 0.05 |
| width/height ratio | 70 | 43 | 74 |
| Fiber content of tape in wt % | 92 | 94 | 96 | the yarn passed the ovens 3 times

Example 2d to 2f

The same procedure was followed as in example 2a to 2c, only as a basic yarn Twaron D2200, 3220 dtex/f 2000 was used. In table 5, the process conditions and the characteristics of the produced tapes are shown.

TABLE 5

| | Experiment no. | | |
|---|---|---|---|
| | 2d | 2e | 2f |
| Yarn speed m/min | 24 | 24 | 25 |
| Liquid thermoplastic used | Entry 1 as a 10 wt % aqueous dispersion | Entry 1 as a 10 wt % aqueous dispersion | Entry 3 as a 10 wt % aqueous dispersion |
| Active polymer content dosed onto the yarn in wt % | 4.5 | 6.0 | 6.0 |
| Temperature 1st/2nd oven | 120° C./120° C. | 150° C./150° C. | 150° C./150° C. |
| Total residence time in ovens | 15 seconds | 15 seconds | 14.4 seconds |
| Number of fixed spreading rods | 3 | 3 | 3 |
| Godet A, temperature | 150° C. | 150° C. | 120° C. |
| Wraps on godet A | 5 | 5 | 6 |
| Yarn tension after godet A | 1400 cN | 1400 cN | 2000 cN |
| Wraps on godet B | 7 | 7 | 8 |
| Produced flexible continuous tape: | | | |
| width in mm | 3.1 | 3.9 | 4.0 |
| height in mm | 0.13 | 0.12 | 0.13 |
| width/height ratio | 24 | 33 | 31 |
| Fiber content of tape in wt % | 96 | 94 | 94 |

Example 3a to 3c

The same procedure was followed as in example 2a to 2c, only the temperature of godet A was kept at room temperature (~20° C.) and a liquid wax (see table 3) was used. In table 6, the process conditions and the characteristics of the produced tapes are shown.

TABLE 6

| | Experiment no. | | |
|---|---|---|---|
| | 3a | 3b | 3c |
| Yarn speed m/min | 9 | 25 | 25 |
| Liquid wax used | Entry 4 as a 32 wt % aqueous dispersion | Entry 5 as a 32 wt % aqueous dispersion | Entry 5 as a 32 wt % aqueous dispersion |

TABLE 6-continued

| | Experiment no. | | |
|---|---|---|---|
| | 3a | 3b | 3c |
| Active polymer content dosed onto the yarn in wt % | 36.5 | 20.0 | 40.0 |
| Temperature 1$^{st}$/2$^{nd}$ oven | 140° C./140° C. | 150° C./150° C. | 150° C./150° C. |
| Total residence time in ovens | 40 seconds | 72 seconds* | 72 seconds* |
| Number of fixed spreading rods | 6 | 10 | 10 |
| Wraps on godet A | 4 | 4 | 4 |
| Yarn tension after godet A | <1000 cN | 1000 cN | 1000 cN |
| Wraps on godet B | 7 | 7 | 7 |
| Produced flexible continuous tape: | | | |
| width in mm | 7 | 3.2 | 3.2 |
| height in mm | 0.04 | 0.05 | 0.07 |
| width/height ratio | 175 | 64 | 46 |
| Fiber content of tape in wt % | 73 | 83 | 71 |

*the yarn passed the ovens 5 times

The produced tapes of examples 2a to 2f and 3a to 3c were flexible and the individual filaments of each tape were fixated.

Example 4

Technora® HMY T 242 (61dtex/f25) is subjected to the following treatments. The yarn is rollingly unwound. The yarn then passes a device to dampen away the tension fluctuations, caused by the unrolling of the yarn. Successively, the yarn passes yarn tension monitor. F1, non heated godet 1, yarn tension monitor F2, plate, yarn tension monitor F3, non heated godet 2 and yarn tension monitor F4. Application of the tested aqueous finishes (see table 5) takes place after tension meter 4 and before entrance of the first tube oven. The tested aqueous finishes are applied by means of a ceramic applicator fed by a glass syringe pump. After the heated first tube oven (intended to evaporate the solvent) a non heated godet 2 and a yarn tension meter F5 is passed. Next the finished yarn passes (non heated) tube oven 2 and non heated godet 3. By applying high yarn tension (tension monitor F6) between the non heated godet 4 and the heated godet 5 the yarn is shaped on hot godet 5 into a tape form. After passing the heated godet 5, the yarn is allowed to cool down (under tension (monitor F7)) before winding.

In Tables 7 and 8, respectively, the used finishes and the process conditions/characteristics are mentioned.

TABLE 7

Used aqueous finishes

| Product name | Entry | Supplier | Composition |
|---|---|---|---|
| Alberdingk Boley U400N | 1 | Alberdingk Boley | polyether-polyurethane dispersion |
| Schlichte LB 100 | 6 | Eastman Chemical Company | Water dispersable polymer (sulphonated polyester) |

TABLE 8

| | Experiment no. | |
|---|---|---|
| | 1 | 2 |
| Yarn speed (m/min) | 4 | 4 |
| Used finish | Entry 1 as a 20 wt % aqueous dispersion | Entry 6 as a 20 wt % aqueous solution |
| solid content dosed onto the yarn in wt % | 22 | 30 |
| Application rate (ml/min) | 0.027 | 0.036 |
| Yarn tensions F1/F2/F3/F4/F5/F6/F7 (cN) | 46/69/88/61/104/640/310 | 50/68/90/106/134/640/310 |
| Temperature 1$^{st}$ oven (3 sections) | 160° C./160° C./200° C. | 160° C./160° C./200° C. |
| Temperature 2$^{nd}$ oven (3 sections) | —/—/— | —/—/— |
| Godet 1-4, temperatures | — | — |
| Wraps on godets 1-4 | 5 | 5 |
| Wraps on heated godet 5 | 5 | 5 |
| Godet 5, temperature (° C.) | 170 | 170 |
| Winding tension (cN) | 260 | 260 |
| Produced flexible continuous microtape: | | |
| width (mm) | 0.1 | 0.15 |
| height (mm) | 0.036 | 0.024 |
| width/height ratio | 2.8 | 6.3 |
| Fiber content of microtape in wt % | 82 | 77 |

Example 5a to 5b

A package of Twaron D2200, 3220 dtex/f 2000 yarn was subjected to the following treatments. The aramid yarn package was rollingly unwound at the yarn tension as given in Table 9, while successively passing the yarn over a liquid applicator, through two hot air ovens (length 3 m each), passing the yarn over a hot godet and finally wound into a package. The yarn unwinding tension was adjusted via a controlled yarn dewinding speed. With the liquid applicator and a tubing pump, the yarn was impregnated with a liquid thermoplastic resin. In the oven, the solvent was partly or completely evaporated. In Table 9, the process conditions and the characteristics of the produced tapes are mentioned. This example illustrates that the width of a tape can be adjusted via the yarn tension without the necessity of using one or more spreading rods.

TABLE 9

|  | Example | |
| --- | --- | --- |
|  | 5a | 5b |
| Yarn speed m/min | 28 | 28 |
| Liquid thermoplastic | Alberdingk U6150* 10 wt % aqueous dispersion | Alberdingk U6150* 10 wt % aqueous dispersion |
| Active polymer content dosed onto the yarn in wt % | 8.0 | 8.0 |
| Temperature 1st/2nd oven | 260° C./260° C. | 260° C./260° C. |
| Total residence time in the ovens | 12.9 seconds | 12.9 seconds |
| Yarn tension before godet | 2800 cN | 3800 cN |
| Godet, temperature | 260° C. | 260° C. |
| Wraps on godet | 8 | 8 |
| Yarn tension after godet | 330 cN | 330 cN |
| Produced flexible continuous tape: | | |
| width in mm | 3.1 | 4.0 |
| height in mm | 0.13 | 0.11 |
| width/height ratio | 24 | 36 |
| Fiber content of tape in wt % | 93 | 93 |

*Alberdingk U6150 is an aqueous polycarbonate-polyurethane dispersion without n-methylpyrrolidone of Alberdingk Boley (Krefeld, Germany).

The invention claimed is:

1. An optical fiber cable comprising:
optical fibers individually covered by a tube obtained by bending a flexible continuous tape and adhering longitudinal sides of the flexible continuous tape with an adhesive, the flexible continuous tape comprising a filament layer, the filament layer comprising a multifilament yarn, wherein
the multifilament yarn is fixated by a cured, or solidified, resin or wax,
the filament layer has a cross sectional aspect ratio (w/h) of 20 to 500, and
the multifilament yarn is 60 to 98 wt % of the flexible continuous tape and the resin or wax is 2 to 40 wt % of the flexible continuous tape.

2. The optical fiber cable according to claim 1, wherein the multifilament yarn is selected from the group consisting of aramid, glass, aromatic polyester, and rigid rod polymer.

3. The optical fiber cable according to claim 1, wherein the resin is a liquid thermoplastic resin.

4. The optical fiber cable according to claim 1, wherein the resin is UV curable.

5. The optical fiber cable according to claim 1, wherein the tube is a cylindrically shaped object.

6. The optical fiber cable according to claim 1, wherein the adhesive is a cured, or solidified, resin or wax.

7. The optical fiber cable according to claim 6, wherein the resin is a liquid thermoplastic resin.

8. The optical fiber cable according to claim 1, wherein the adhesive is a thermoplastic resin and the multifilament yarn is fixated by the same thermoplastic resin.

* * * * *